United States Patent
Li et al.

(10) Patent No.: US 11,745,670 B2
(45) Date of Patent: Sep. 5, 2023

(54) PROTECTIVE CASE SYSTEM FOR USE WITH ELECTRONIC DEVICE

(71) Applicant: Otter Products, LLC, Fort Collins, CO (US)

(72) Inventors: Shanshan Li, Fort Collins, CO (US); Joseph A. Prizzi, Vista, CA (US); Kevin M. Malak, San Diego, CA (US); Jeffrey C. Wicks, Fort Collins, CO (US); Andrew J. Walla, Aurora, CO (US)

(73) Assignee: Otter Products, LLC, Fort Collins, CO (US)

( * ) Notice: Subject to any disclaimer, the term of this patent is extended or adjusted under 35 U.S.C. 154(b) by 456 days.

(21) Appl. No.: 17/168,258

(22) Filed: Feb. 5, 2021

(65) Prior Publication Data
US 2021/0347312 A1    Nov. 11, 2021

Related U.S. Application Data

(60) Provisional application No. 63/020,619, filed on May 6, 2020.

(51) Int. Cl.
*H04M 1/00* (2006.01)
*B60R 11/02* (2006.01)
(Continued)

(52) U.S. Cl.
CPC .......... *B60R 11/0241* (2013.01); *A45C 11/00* (2013.01); *F16M 13/02* (2013.01); *H04B 1/3888* (2013.01); *A45C 2011/002* (2013.01)

(58) Field of Classification Search
CPC ..... B60R 11/0241; A45C 11/00; F16M 13/02; H04B 1/3888
See application file for complete search history.

(56) References Cited

U.S. PATENT DOCUMENTS 3,023,885 A    3/1962    Kindseth
4,029,999 A    6/1977    Neumann et al.
(Continued)

FOREIGN PATENT DOCUMENTS

CN    202488509 U    10/2012
KR    200446444      10/2009
(Continued)

OTHER PUBLICATIONS outfityours.com (Top 5 Best Clear iPhone 5S and iPhone 5 Cases—Incase, Otterbox, Giffin, Moshi [retrieved from https://www.youtube.com/watch?v=rWYKJvsDHPw], YouTube.com [online], May 17, 2013 [retrieved Oct. 11, 2017}, 3 pages.
(Continued)

*Primary Examiner* — Simon King

(57)    ABSTRACT

A protective case system for use with an electronic device includes a protective case, a handle, and an adapter. The protective case removably receives the electronic device and a display screen of the electronic device remains accessible when the electronic device is installed in the protective case. The handle is attached to and extends outward from a back surface of the protective case. The handle is configured for carrying the protective case and the installed electronic device. The adapter is configured to be removably attachable to the handle and bendable by a user to a plurality of positions. The adapter is configured to function as a multi-position stand for the protective case and the installed electronic device. The adapter is further configured to removably affix the protective case and the installed electronic device to headrest posts of a seat.

20 Claims, 15 Drawing Sheets

(51) Int. Cl.
  *A45C 11/00* (2006.01)
  *H04B 1/3888* (2015.01)
  *F16M 13/02* (2006.01)

(56) References Cited

U.S. PATENT DOCUMENTS

| | | |
|---|---|---|
| 4,097,878 A | 6/1978 | Cramer |
| 4,584,718 A | 4/1986 | Fuller |
| 4,856,658 A | 8/1989 | Novak |
| 4,925,146 A | 5/1990 | Hegarty |
| 4,933,988 A | 6/1990 | Thibault |
| 4,981,243 A | 1/1991 | Rogowski |
| 5,025,921 A | 6/1991 | Gasparaitis et al. |
| 5,123,044 A | 6/1992 | Tate |
| 5,138,523 A | 8/1992 | Benck et al. |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| D365,927 S | 1/1996 | Cho |
| 5,508,479 A | 4/1996 | Schooley |
| 5,541,813 A | 7/1996 | Satoh et al. |
| 5,671,120 A | 9/1997 | Kikinisi |
| 5,808,865 A | 9/1998 | Alves |
| 6,097,593 A | 8/2000 | Faranda et al. |
| 6,115,248 A | 9/2000 | Canova et al. |
| 6,151,206 A | 11/2000 | Kato et al. |
| 6,283,299 B1 | 9/2001 | Lee |
| 6,311,017 B1 | 10/2001 | Mori |
| 6,317,313 B1 | 11/2001 | Mosgrove et al. |
| 6,349,824 B1 | 2/2002 | Yamada |
| 6,375,009 B1 | 4/2002 | Lee |
| 6,445,577 B1 | 9/2002 | Madsen et al. |
| 6,456,487 B1 | 9/2002 | Hetterick |
| 6,490,155 B2 | 12/2002 | Han et al. |
| 6,545,862 B1 | 4/2003 | Gettemy et al. |
| 6,616,111 B1 | 9/2003 | White |
| 6,625,394 B2 | 9/2003 | Smith et al. |
| 6,626,362 B1 | 9/2003 | Steiner et al. |
| 6,701,159 B1 | 3/2004 | Powell |
| 6,762,935 B2 | 7/2004 | Hidewasa |
| 6,865,076 B2 | 3/2005 | Lunsford |
| 6,966,519 B2 | 11/2005 | Salentine et al. |
| 7,050,841 B1 | 5/2006 | Onda |
| 7,072,699 B2 | 7/2006 | Eiden |
| D526,780 S | 8/2006 | Richardson et al. |
| 7,145,767 B2 | 12/2006 | Mache et al. |
| 7,194,291 B2 | 3/2007 | Peng |
| D542,524 S | 5/2007 | Richardson et al. |
| 7,236,588 B2 | 6/2007 | Gartrell |
| 7,343,184 B2 | 3/2008 | Rostami |
| 7,359,184 B2 | 4/2008 | Lord |
| D574,819 S | 8/2008 | Andre et al. |
| D581,155 S | 11/2008 | Richardson et al. |
| D581,421 S | 11/2008 | Richardson et al. |
| D587,008 S | 2/2009 | Richardson et al. |
| D589,016 S | 3/2009 | Richardson et al. |
| 7,555,325 B2 | 6/2009 | Goros |
| 7,558,594 B2 | 7/2009 | Wilson |
| 7,688,580 B2 | 3/2010 | Richardson et al. |
| 7,845,608 B1 | 12/2010 | Chen et al. |
| 7,889,489 B2 | 2/2011 | Richardson et al. |
| 7,907,394 B2 | 3/2011 | Richardson et al. |
| 7,933,122 B2 | 4/2011 | Richardson et al. |
| 8,049,727 B2 | 11/2011 | Hanson et al. |
| 8,204,561 B2 | 6/2012 | Mongan et al. |
| 8,226,054 B2 | 7/2012 | Chen et al. |
| 8,442,604 B1 | 5/2013 | Diebel |
| 8,453,344 B2 | 6/2013 | Nishiwaki et al. |
| 8,457,701 B2 | 6/2013 | Diebel |
| 8,490,783 B1 | 7/2013 | Fan |
| 8,509,865 B1 | 8/2013 | LaColla et al. |
| 8,560,031 B2 | 10/2013 | Barnett et al. |
| 8,567,599 B2 | 10/2013 | Beatty et al. |
| 8,599,547 B2 | 12/2013 | Richardson et al. |
| 8,613,349 B1 | 12/2013 | Halko et al. |
| 8,676,281 B1 | 3/2014 | Caulder et al. |
| 8,755,852 B2 | 6/2014 | Hynecek et al. |
| 8,777,002 B2 | 7/2014 | Thomas et al. |
| 8,798,675 B2 | 8/2014 | Salmon et al. |
| 8,800,762 B2 | 8/2014 | Fathollahi |
| 8,950,725 B2 | 2/2015 | Huang et al. |
| 8,965,458 B2 | 2/2015 | Richardson et al. |
| 9,008,738 B1 | 4/2015 | Dong |
| 9,060,580 B2 | 6/2015 | Tages |
| 9,086,842 B2 | 7/2015 | Wen et al. |
| 9,089,056 B2 | 7/2015 | Rayner |
| 9,098,238 B2 | 8/2015 | Richardson et al. |
| 9,125,297 B2 | 9/2015 | Magness |
| 9,136,897 B2 | 9/2015 | Hynecek et al. |
| 9,153,112 B1 | 10/2015 | Kiani et al. |
| 9,226,057 B1 | 12/2015 | Davis et al. |
| 9,266,664 B2 | 2/2016 | Bau |
| 9,274,556 B2 | 3/2016 | Gallouzi et al. |
| 9,295,174 B2 | 3/2016 | Witter et al. |
| 9,316,026 B2 | 4/2016 | Myers et al. |
| 9,367,090 B2 | 6/2016 | Barnett et al. |
| 9,377,154 B2 | 6/2016 | Hung et al. |
| D762,258 S | 7/2016 | Jenkins |
| 9,408,448 B2 | 8/2016 | Kay et al. |
| D766,226 S | 9/2016 | Wu |
| D766,227 S | 9/2016 | Wu |
| D769,855 S | 10/2016 | Deng |
| 9,462,099 B2 | 10/2016 | Wilson et al. |
| 9,481,490 B2 | 11/2016 | Venida et al. |
| 9,487,376 B2 | 11/2016 | Salentine et al. |
| 9,501,101 B2 | 11/2016 | Daley, III |
| 9,503,147 B2 | 11/2016 | Witter et al. |
| 9,537,526 B2 | 1/2017 | Wilson et al. |
| 9,540,856 B2 | 1/2017 | Lin |
| 9,545,140 B1 | 1/2017 | Johnson et al. |
| 9,615,476 B2 | 4/2017 | Rayner et al. |
| 9,622,556 B2 | 4/2017 | Fathollahi et al. |
| 9,654,605 B2 | 5/2017 | Goldfain et al. |
| 9,660,684 B2 | 5/2017 | Rayner |
| 9,687,076 B2 | 6/2017 | Su |
| 9,743,540 B2 | 8/2017 | Magness |
| 9,774,713 B2 | 9/2017 | Guerdrum et al. |
| 9,788,620 B1 | 10/2017 | Parkinson |
| 9,807,211 B2 | 10/2017 | Guerdrum et al. |
| 9,851,758 B2 | 12/2017 | Rowley |
| D808,376 S | 1/2018 | Kim |
| D808,377 S | 1/2018 | Witter et al. |
| 9,854,897 B1 | 1/2018 | Pelkey, Jr. et al. |
| 9,871,550 B2 | 1/2018 | Witter et al. |
| 9,946,301 B2 | 4/2018 | Lan et al. |
| D824,376 S | 7/2018 | Lee |
| 10,027,783 B2 | 7/2018 | Dukerschein et al. |
| 10,058,155 B2 | 8/2018 | Guerdrum et al. |
| D827,627 S | 9/2018 | Lee |
| D829,700 S | 10/2018 | Kim |
| 10,103,769 B2 | 10/2018 | Witter et al. |
| 10,136,716 B2 | 11/2018 | Northrup et al. |
| 10,178,903 B2 | 1/2019 | Guerdrum et al. |
| 10,206,472 B1 | 2/2019 | Northrup et al. |
| 10,216,223 B2 | 2/2019 | Hsu et al. |
| 10,485,312 B2 | 11/2019 | Rodriguez |
| 2001/0054594 A1 | 12/2001 | Maier-Hunke |
| 2002/0065054 A1 | 5/2002 | Humphreys et al. |
| 2002/0079244 A1 | 6/2002 | Kwong |
| 2004/0134812 A1 | 7/2004 | Yeh |
| 2004/0150945 A1 | 8/2004 | Mache et al. |
| 2005/0088811 A1 | 4/2005 | Ulla et al. |
| 2005/0213298 A1 | 9/2005 | Doherty et al. |
| 2005/0224508 A1 | 10/2005 | Tajiri et al. |
| 2005/0279661 A1 | 12/2005 | Hodges |
| 2006/0027718 A1 | 2/2006 | Quijano et al. |
| 2006/0066438 A1 | 3/2006 | Altounian et al. |
| 2006/0172765 A1 | 8/2006 | Lev |
| 2006/0237495 A1 | 10/2006 | Chen et al. |
| 2006/0243679 A1 | 11/2006 | Dickerson |

(56) References Cited

U.S. PATENT DOCUMENTS

| | | | |
|---|---|---|---|
| 2006/0255493 A1 | 11/2006 | Fouladpour | |
| 2007/0071423 A1 | 3/2007 | Fantone et al. | |
| 2007/0115387 A1 | 5/2007 | Ho | |
| 2007/0146985 A1 | 6/2007 | Mick et al. | |
| 2007/0158220 A1 | 7/2007 | Cleereman et al. | |
| 2007/0297149 A1 | 12/2007 | Richardson et al. | |
| 2008/0117578 A1 | 5/2008 | Moscovitch | |
| 2008/0163463 A1 | 7/2008 | Hulden | |
| 2008/0304692 A1 | 12/2008 | Zhang | |
| 2009/0001232 A1 | 1/2009 | Seo et al. | |
| 2009/0034169 A1 | 2/2009 | Richardson et al. | |
| 2009/0079665 A1 | 3/2009 | Moscovitch | |
| 2009/0161903 A1 | 6/2009 | White | |
| 2009/0237377 A1 | 9/2009 | Lai et al. | |
| 2009/0283184 A1 | 11/2009 | Han | |
| 2010/0006468 A1 | 1/2010 | Lin | |
| 2010/0090085 A1 | 4/2010 | Corrion | |
| 2010/0093412 A1 | 4/2010 | Serra et al. | |
| 2010/0122756 A1 | 5/2010 | Longinotti-Buitoni | |
| 2010/0141864 A1 | 6/2010 | Lai | |
| 2010/0147737 A1 | 6/2010 | Richardson et al. | |
| 2010/0195279 A1 | 8/2010 | Michael | |
| 2010/0203931 A1 | 8/2010 | Hynecek et al. | |
| 2010/0215188 A1 | 8/2010 | Wilcox | |
| 2010/0230301 A1 | 9/2010 | Fellig | |
| 2011/0064401 A1 | 3/2011 | DeSorbo | |
| 2011/0075349 A1 | 3/2011 | Ma et al. | |
| 2011/0170256 A1 | 7/2011 | Lee | |
| 2011/0192857 A1 | 8/2011 | Rothbaum et al. | |
| 2011/0216495 A1 | 9/2011 | Marx | |
| 2011/0228459 A1 | 9/2011 | Richardson et al. | |
| 2011/0235846 A1 | 9/2011 | Jiang et al. | |
| 2011/0294556 A1 | 12/2011 | Carlberg et al. | |
| 2012/0018325 A1 | 1/2012 | Kim | |
| 2012/0031788 A1 | 2/2012 | Mongan et al. | |
| 2012/0037524 A1 | 2/2012 | Thomas et al. | |
| 2012/0037536 A1 | 2/2012 | Thomas et al. | |
| 2012/0106069 A1 | 5/2012 | Strauser | |
| 2012/0111881 A1 | 5/2012 | Gaddis et al. | |
| 2012/0170194 A1 | 7/2012 | Lord et al. | |
| 2012/0287565 A1 | 11/2012 | Bennett | |
| 2012/0308164 A1* | 12/2012 | Hudson | H04M 1/04 383/98 |
| 2012/0325607 A1 | 12/2012 | Webster et al. | |
| 2013/0027862 A1 | 1/2013 | Rayner | |
| 2013/0039521 A1 | 2/2013 | Zhou et al. | |
| 2013/0083953 A1 | 4/2013 | Chang | |
| 2013/0088813 A1 | 4/2013 | Su et al. | |
| 2013/0098788 A1 | 4/2013 | McCarville et al. | |
| 2013/0107449 A1 | 5/2013 | Su et al. | |
| 2013/0109253 A1 | 5/2013 | Gammon et al. | |
| 2013/0117487 A1 | 5/2013 | Leung | |
| 2013/0126533 A1 | 5/2013 | Klosky | |
| 2013/0175186 A1 | 7/2013 | Simmer | |
| 2013/0177181 A1 | 7/2013 | Marcus | |
| 2013/0181492 A1* | 7/2013 | Prescott | B60R 7/088 297/217.1 |
| 2013/0220841 A1 | 8/2013 | Yang | |
| 2013/0220847 A1 | 8/2013 | Fisher et al. | |
| 2013/0222989 A1 | 8/2013 | Chen | |
| 2013/0230202 A1 | 9/2013 | Widner et al. | |
| 2013/0240578 A1 | 9/2013 | Yu | |
| 2013/0262248 A1 | 10/2013 | Kim et al. | |
| 2013/0292269 A1 | 11/2013 | Tages | |
| 2013/0292288 A1 | 11/2013 | Willes | |
| 2014/0003647 A1 | 1/2014 | Liu | |
| 2014/0049142 A1 | 2/2014 | Magness | |
| 2014/0065847 A1 | 3/2014 | Salmon et al. | |
| 2014/0080553 A1 | 3/2014 | Torset et al. | |
| 2014/0097102 A1 | 4/2014 | Piatt et al. | |
| 2014/0099526 A1 | 4/2014 | Powell et al. | |
| 2014/0128132 A1 | 5/2014 | Cox, I | |
| 2014/0141838 A1 | 5/2014 | Cai et al. | |
| 2014/0152890 A1 | 6/2014 | Rayner | |
| 2014/0165366 A1* | 6/2014 | Hochman | H04M 1/04 248/176.1 |
| 2014/0166707 A1 | 6/2014 | Leisey-Bartsch | |
| 2014/0168884 A1 | 6/2014 | Wylie | |
| 2014/0183064 A1 | 7/2014 | Ge | |
| 2014/0183065 A1 | 7/2014 | Toulotte | |
| 2014/0187289 A1 | 7/2014 | Cataldo et al. | |
| 2014/0200056 A1 | 7/2014 | Liu | |
| 2014/0202885 A1* | 7/2014 | Bell | A45C 11/00 206/37 |
| 2014/0227026 A1 | 8/2014 | O'Neill et al. | |
| 2014/0228074 A1 | 8/2014 | Kulkarni et al. | |
| 2014/0262848 A1 | 9/2014 | Fathollahi et al. | |
| 2014/0262934 A1 | 9/2014 | Fathollahi et al. | |
| 2014/0265765 A1 | 9/2014 | Khodapanah et al. | |
| 2014/0265767 A1 | 9/2014 | Fathollahi | |
| 2014/0299488 A1 | 10/2014 | Andrew | |
| 2014/0302896 A1 | 10/2014 | Xu et al. | |
| 2014/0332418 A1 | 11/2014 | Cheung et al. | |
| 2015/0061477 A1 | 3/2015 | Wilson | |
| 2015/0062787 A1 | 3/2015 | Wilson et al. | |
| 2015/0068935 A1 | 3/2015 | Kay et al. | |
| 2015/0083615 A1 | 3/2015 | Lay et al. | |
| 2015/0111623 A1 | 4/2015 | Hegemier et al. | |
| 2015/0111626 A1* | 4/2015 | Bell | A45C 11/00 455/575.8 |
| 2015/0133183 A1 | 5/2015 | Alameh et al. | |
| 2015/0141090 A1 | 5/2015 | Hwan et al. | |
| 2015/0141095 A1 | 5/2015 | Kim | |
| 2015/0172431 A1 | 6/2015 | Huang | |
| 2015/0189160 A1 | 7/2015 | Auger et al. | |
| 2015/0194997 A1 | 7/2015 | Johnson et al. | |
| 2015/0194998 A1 | 7/2015 | Fathollahi | |
| 2015/0195938 A1 | 7/2015 | Witter et al. | |
| 2015/0201723 A1 | 7/2015 | Rayner et al. | |
| 2015/0214989 A1 | 7/2015 | Yeh et al. | |
| 2015/0220766 A1 | 8/2015 | Russell et al. | |
| 2015/0257285 A1 | 9/2015 | Wilson et al. | |
| 2015/0257287 A1 | 9/2015 | Tages | |
| 2015/0301560 A1* | 10/2015 | Garland, Sr. | G03B 17/561 455/575.8 |
| 2015/0304466 A1 | 10/2015 | Tamatsu | |
| 2016/0007705 A1 | 1/2016 | Liebers et al. | |
| 2016/0036478 A1 | 2/2016 | Wong | |
| 2016/0072933 A1 | 3/2016 | Cox, I | |
| 2016/0080024 A1 | 3/2016 | Wilson et al. | |
| 2016/0088750 A1 | 3/2016 | Wu | |
| 2016/0090767 A1 | 3/2016 | Park et al. | |
| 2016/0113368 A1 | 4/2016 | Tu et al. | |
| 2016/0122821 A1 | 5/2016 | Liu et al. | |
| 2016/0142093 A1 | 5/2016 | Phang | |
| 2016/0164565 A1 | 6/2016 | Witter et al. | |
| 2016/0173670 A1 | 6/2016 | Langhein | |
| 2016/0179143 A1 | 6/2016 | Bidwell et al. | |
| 2016/0183392 A1 | 6/2016 | Kelley | |
| 2016/0195898 A1 | 7/2016 | Lau | |
| 2016/0198822 A1 | 7/2016 | Lee et al. | |
| 2016/0254836 A1 | 9/2016 | Alsberg et al. | |
| 2016/0261133 A1 | 9/2016 | Wang | |
| 2016/0282905 A1 | 9/2016 | Laine et al. | |
| 2016/0286920 A1 | 10/2016 | Lean et al. | |
| 2016/0286921 A1 | 10/2016 | Northrup et al. | |
| 2016/0295981 A1 | 10/2016 | Lay et al. | |
| 2017/0026498 A1 | 1/2017 | Goldfain et al. | |
| 2017/0041037 A1 | 2/2017 | Witter et al. | |
| 2017/0099922 A1 | 4/2017 | Guerdrum et al. | |
| 2017/0099924 A1 | 4/2017 | Fathollahi et al. | |
| 2017/0119120 A1 | 5/2017 | Richardson et al. | |
| 2017/0237460 A1 | 8/2017 | Rayner | |
| 2017/0279478 A1 | 9/2017 | Fathollahi | |
| 2017/0327054 A1 | 11/2017 | Yu et al. | |
| 2017/0328517 A1 | 11/2017 | Wessels | |
| 2017/0353208 A1 | 12/2017 | Wilson et al. | |
| 2017/0359096 A1 | 12/2017 | Witter et al. | |
| 2017/0360200 A1 | 12/2017 | Cohen | |
| 2018/0136695 A1 | 5/2018 | Lo et al. | |
| 2018/0167498 A1 | 6/2018 | Drakos | |
| 2018/0271242 A1* | 9/2018 | Cavaretta, III | A45C 13/02 |
| 2018/0369599 A1 | 12/2018 | Smith | |

(56) References Cited

U.S. PATENT DOCUMENTS

| | | |
|---|---|---|
| 2019/0094853 A1 | 3/2019 | Overall |
| 2019/0141848 A1 | 5/2019 | Sung |
| 2019/0212774 A1 | 7/2019 | Patterson et al. |
| 2019/0222682 A1 | 7/2019 | Ren et al. |
| 2019/0250664 A1 | 8/2019 | Eslava et al. |
| 2019/0281147 A1 | 9/2019 | Sherburne et al. |
| 2019/0286191 A1 | 9/2019 | Correll, Jr. |
| 2020/0200322 A1 | 6/2020 | Mareks, Jr. et al. |

FOREIGN PATENT DOCUMENTS

| | | |
|---|---|---|
| KR | 101394285 | 5/2014 |
| WO | 1994000037 A1 | 1/1994 |
| WO | 1999041958 A1 | 8/1999 |
| WO | 2015103599 A1 | 7/2015 |

OTHER PUBLICATIONS

Randomrazr (New Otterbox Symmetry Case—The Slim Protective Case for the iPhone 5S/5C [retrieved from https://wwwyoutube.com/watch?v=zGWZTGamuT0], YouTube.com [online], Mar. 30, 2014 [retrieved Oct. 11, 2017]), 5 pages.

* cited by examiner

PROTECTIVE CASE SYSTEM FOR USE WITH ELECTRONIC DEVICE

This application claims priority to U.S. Provisional Patent Application No. 63/020,619, filed May 6, 2020, which is hereby incorporated by reference in its entirety.

BACKGROUND

Personal electronic devices are commonly used for communication and entertainment, as well as for a variety of other purposes. Examples of personal electronic devices include smartphones, tablet computers, gaming devices, audio players, video players, cameras, portable computers, two-way radios, GPS receivers, and/or other portable devices. Tablet computers have become more common and are often used by children, and often in a portable manner. It is not only desirable to have protective cases that protect these types of electronic devices from damage, but also include features for making them easier to carry as well as making them attachable to other objects.

SUMMARY

In one exemplary embodiment, a protective case system for use with an electronic device includes a protective case, a handle, and an adapter. The handle is removably attachable at a back surface of the protective case. The handle is configured for carrying the protective case and the electronic device when the handle is attached to the protective case and the electronic device is installed in the protective case. The adapter is removably attachable to the handle and is configured to function as a stand for the protective case. The adapter is further configured to removably attach to headrest posts of a seat.

In another exemplary embodiment, a protective case system for use with an electronic device includes a protective case, a handle, and an adapter. The protective case removably receives the electronic device and a display screen of the electronic device remains accessible when the electronic device is installed in the protective case. The handle is attached to and extends outward from a back surface of the protective case. The handle is configured for carrying the protective case and the installed electronic device. The adapter is configured to be removably attachable to the handle and bendable by a user to a plurality of positions. The adapter is configured to function as a multi-position stand for the protective case and the installed electronic device. The adapter is further configured to removably affix the protective case and the installed electronic device to a seat.

While several examples are provided above for purposes of illustration and description, other modifications and variations may be possible in view of the teachings herein. The embodiments described herein illustrate and explain the principles of the concept and its practical application to enable others skilled in the art to best utilize the invention.

DETAILED DESCRIPTION

Electronic devices are increasingly used with protective cases that protect the electronic devices from a variety or forces or elements such as: dropping, impact, scratching, water, dirt, dust, rain, snow, and/or chemicals. Children use electronic devices more and more frequently. Children often use tablet computers for entertainment, education, and/or gaming and may use them in a variety of different locations or settings. It is desirable to provide accessories which enable people, and particularly children, to more easily carry the electronic devices as well as use them in a variety of settings. Some desirable improvements include carrying handles, stands which can be adapted to a variety of situations, and adapters for conveniently attaching to a car headrest.

While most of the electronic device cases disclosed herein are described as "protective" cases, the apparatuses and techniques disclosed herein related to removable modules do not necessarily require that the case is protective and could apply to any type of electronic device case, cover, sleeve, sheath, attachment panel, etc. In other examples, the case may be water resistant or water proof for protecting the electronic device from water or other liquids. In yet other examples, the case may have other characteristics, such as but not limited to, chemical resistance and antimicrobial characteristics. Moreover, while the electronic device cases disclosed herein are generally understood to serve as aftermarket accessories for original equipment electronic devices (i.e., smartphones, tablet computers, gaming devices, audio players, video players, cameras, portable computers, two-way radios, GPS receivers, other portable devices, etc.), the apparatuses and techniques described herein could also be applied to the primary housings of original equipment electronic devices themselves. Further, while many of the uses described herein are described with respect to use by kids or children, the apparatuses and techniques described herein are equally applicable to a variety of types of users or use scenarios.

Figure 1:
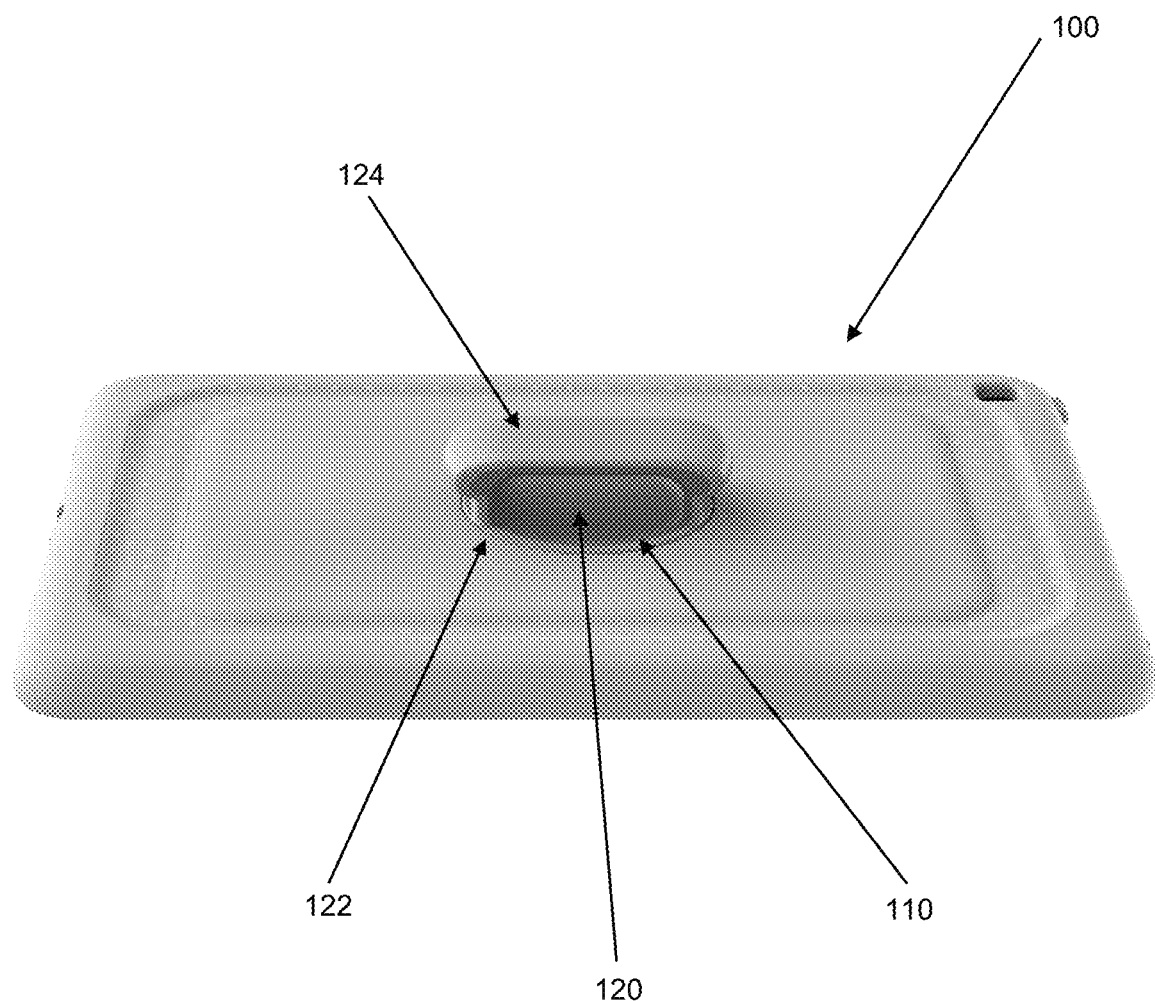
FIG. 1 illustrates an assembly including a case with a handle attachment.

FIG. 1 illustrates an exemplary case 100 for use with an electronic device 90 (not shown in FIG. 1, but shown in at least FIGS. 3B and 4), such as a smartphone, a tablet computer, a gaming device, an audio player, a video player, a camera, a portable computer, a two-way radio, a GPS receiver, and/or another portable device. Case 100 may include an inner liner and an outer shell. Case 100 may include various openings or apertures for accessing features of electronic device 90. Case 100 may also include features for actuating buttons or switches of electronic device 90. Case 100 may be protective, chemical-resistant, antibacterial, water-resistant, and/or waterproof.

As illustrated in FIG. 1, case 100 includes a receiver 110 for receiving a handle attachment 120. Receiver 110 may include a receiver area, a recess, a hole, a slot, one or more attachment mechanisms, threads, tabs, clips, snaps, ridges, a friction fit, and/or an interference fit for removably or releasably attaching handle attachment 120 to case 100. Handle attachment 120 includes a handle base 122 and a handle 124. Handle base 122 is received by or attaches to receiver 110 of case 100. In some examples, handle base 122 may temporarily or removably attach to receiver 110 in a rotational or twist-lock manner. While handle attachment 120 is attached to case 100, handle 124 can be used to carry case 100 along with any installed electronic device. The size, shape, and/or orientation of handle 124 may make it easier to carry case 100, particularly for a child. Handle 124 may also make it less likely that case 100 and the associated electronic device are accidentally dropped. Handle 124 may have other shapes, sizes, and/or configurations.

Figure 2A:
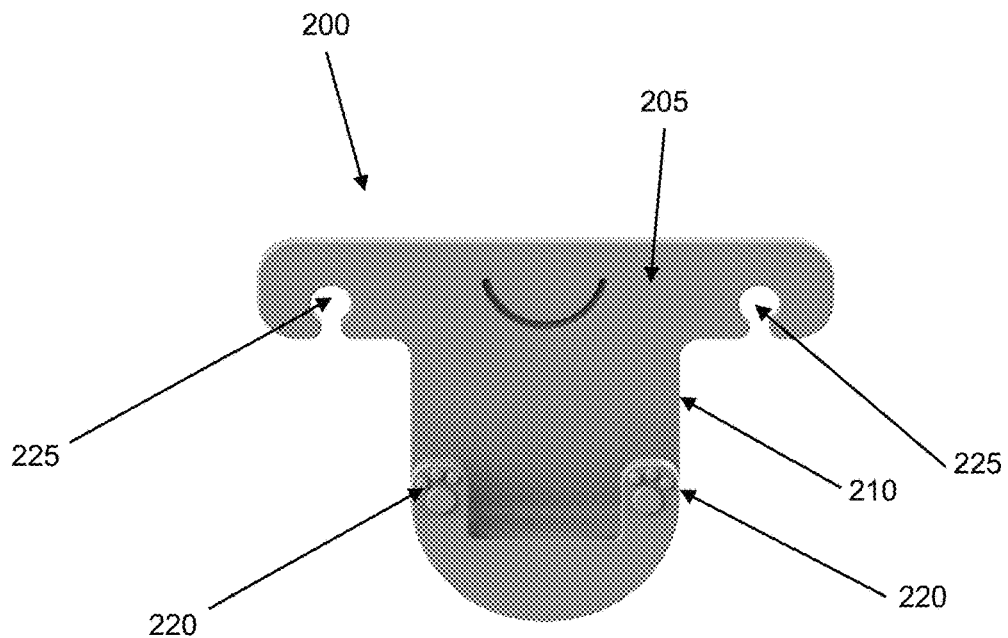
FIG. 2A illustrates an adapter for use with the assembly of FIG. 1.

FIG. 2A illustrates an adapter 200 for use with case 100 and handle attachment 120. Adapter 200 includes an adapter foot portion 205 and an adapter body portion 210. While specific shapes are illustrated in the figures herein, many other shapes are possible. Adapter foot portion 205 includes post receivers 225 which are discussed in more detail with respect to FIG. 4. At an opposite end of adapter 200 from adapter foot portion 205, adapter 200 also includes clips 220 which are discussed in more detail with respect to FIG. 2D. Adapter 200 may also be referred to as an arm, a stand, or an accessory.

Figure 2B:
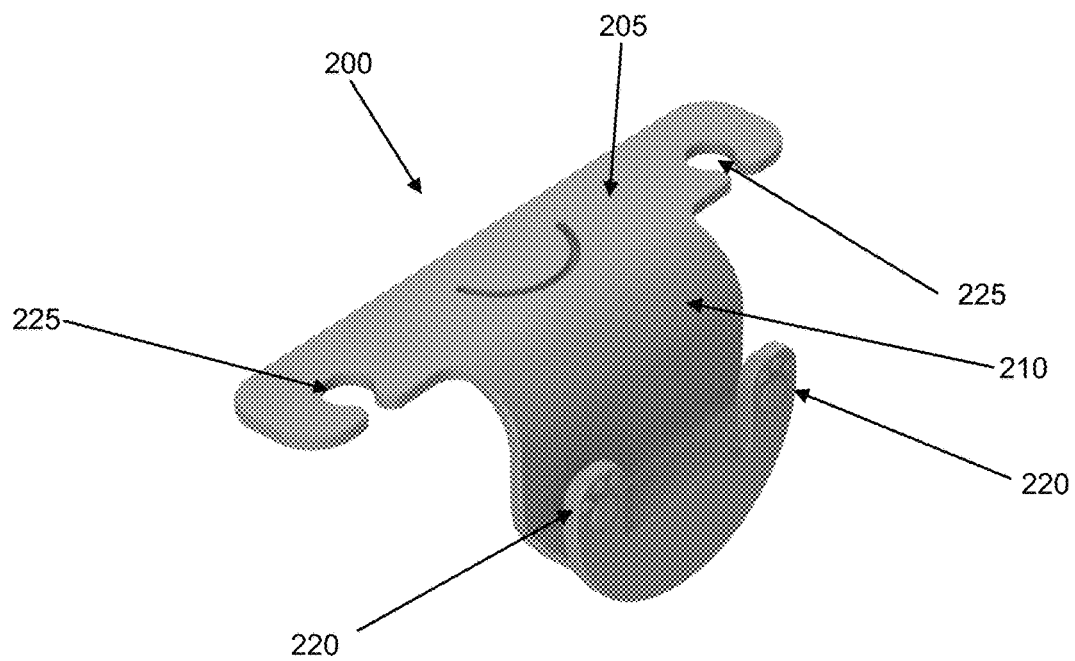
FIG. 2B illustrates another view of the adapter of FIG. 2A.
Figure 2C:
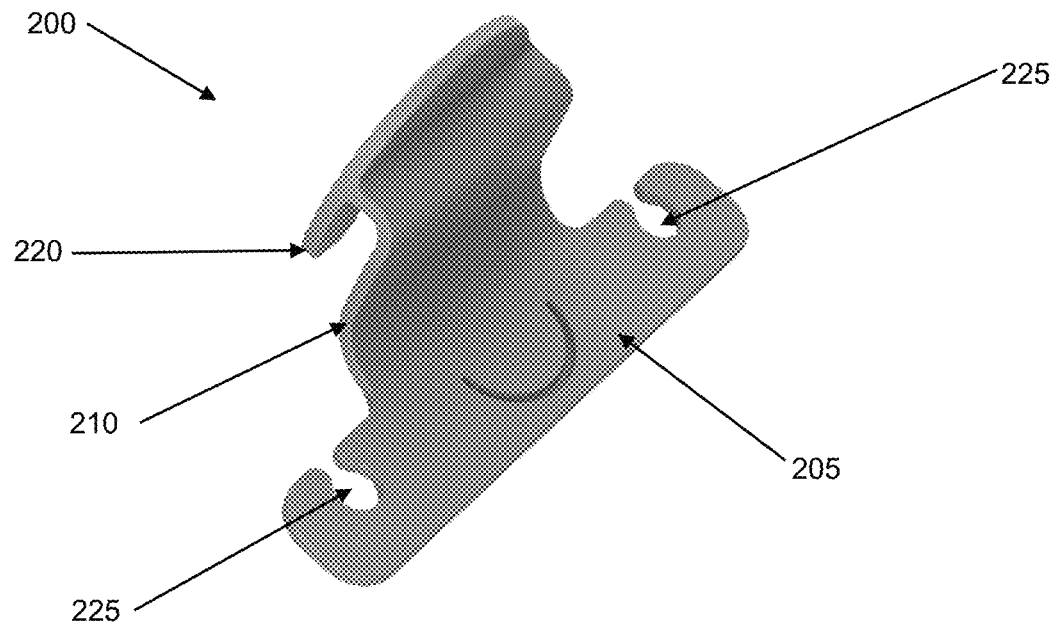
FIG. 2C illustrates another view of the adapter of FIG. 2A.

Adapter body 210 is formed, at least in part, from a flexible, bendable, or pliable material that is bendable and retains its shape after being bent, at least in part. Adapter body 210 may also later be bent to a different shape. Many materials are possible. In some cases, adapter body 210 may be formed from a shape memory material. FIG. 2B illustrates adapter 200 where adapter body 210 has been bent to a roughly 90 degree angle. It remains in that shape until it is bent back, or bent to another shape or configuration. FIG. 2C illustrates an opposite side view of adapter 200 of FIG. 2B.

Figure 2D:
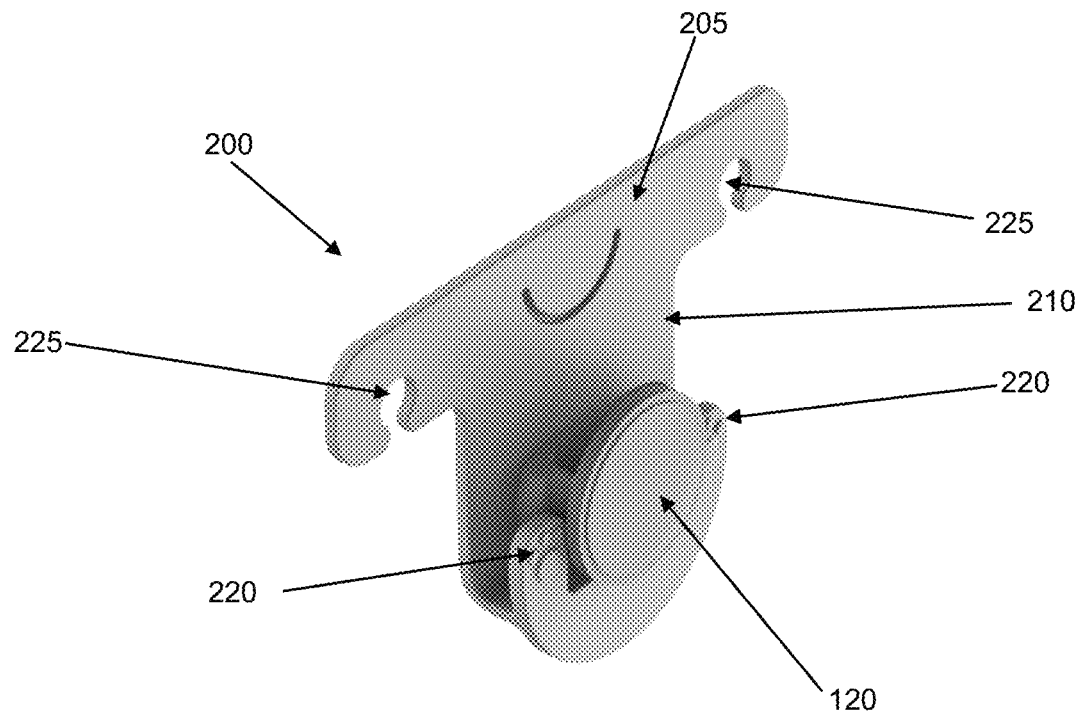
FIG. 2D illustrates the adapter of FIG. 2A with the handle attachment of FIG. 1.

FIG. 2D illustrates adapter 200 with handle attachment 120 inserted and temporarily attached, affixed, or retained by clips 220. Clips 220 may be flexible and may flex to removably or temporarily hold handle attachment 120 with an interference fit, a friction fit, and/or a snap fit such that it remains attached for use, but can be removed if a sufficient force is applied.

Figure 3A:
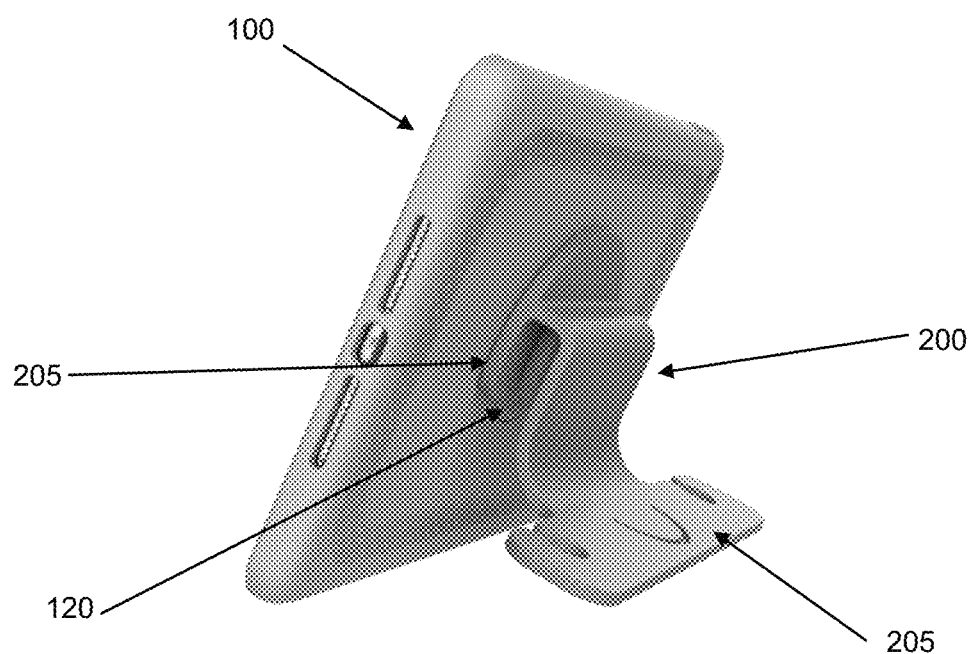
FIG. 3A illustrates the assembly of FIG. 1 in use with the adapter of FIG. 2A.
Figure 3B:
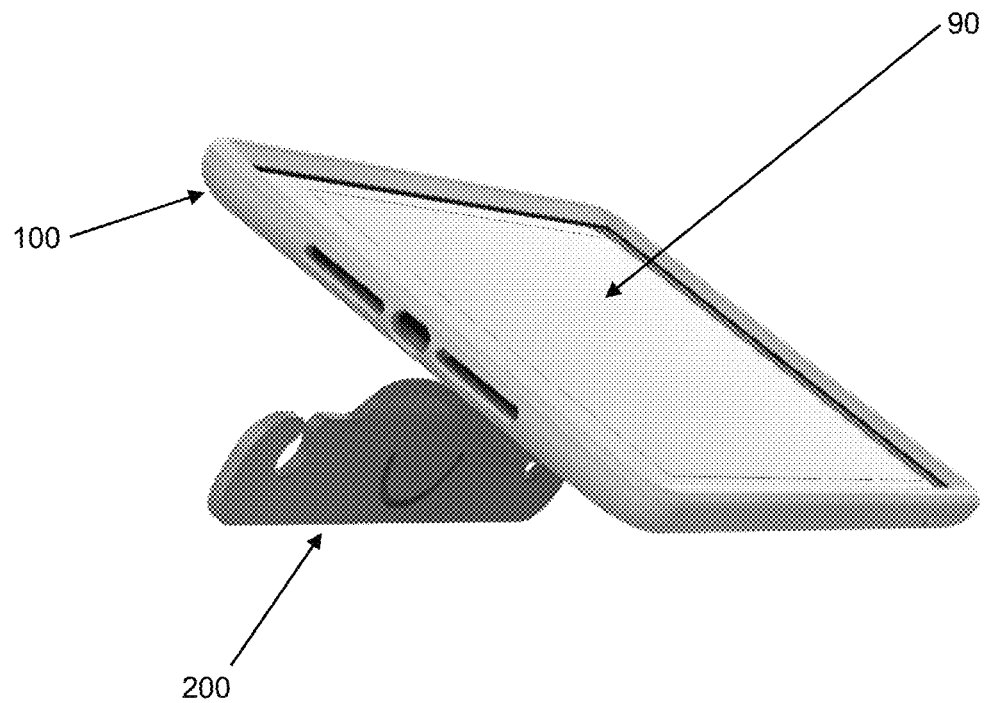
FIG. 3B illustrates the assembly of FIG. 3A in a different orientation.

FIG. 3A illustrates the assembly of FIG. 2D with handle attachment 120 attached to case 100. In this configuration, adapter 200 acts as an adjustable stand for holding case 100 in a viewing orientation on a horizontal, or substantially horizontal, surface. Adapter body 210 can be bent to adjust the viewing angle of the assembly. For example, FIG. 3B illustrates the assembly of FIG. 3A in a different viewing orientation. Adapter body 210 may be bent to different angles or positions to accommodate different situations or environments. When not in use as a stand, adapter 200 can be folded flat, or nearly flat, to reduce the amount of space it takes up. For example, FIG. 3C illustrates the assembly of FIG. 3B with adapter 200 folded flat, or substantially flat.

Figure 3C:
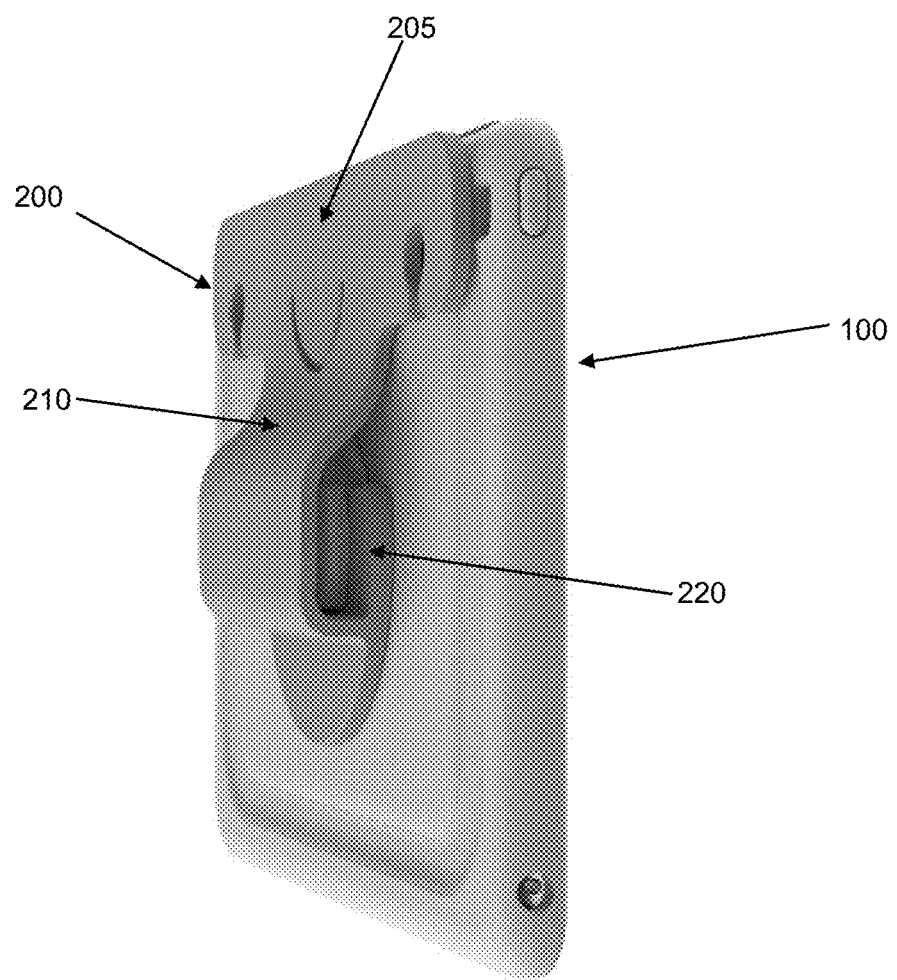
FIG. 3C illustrates another orientation of the assembly of FIGS. 3A and 3B.
Figure 4:
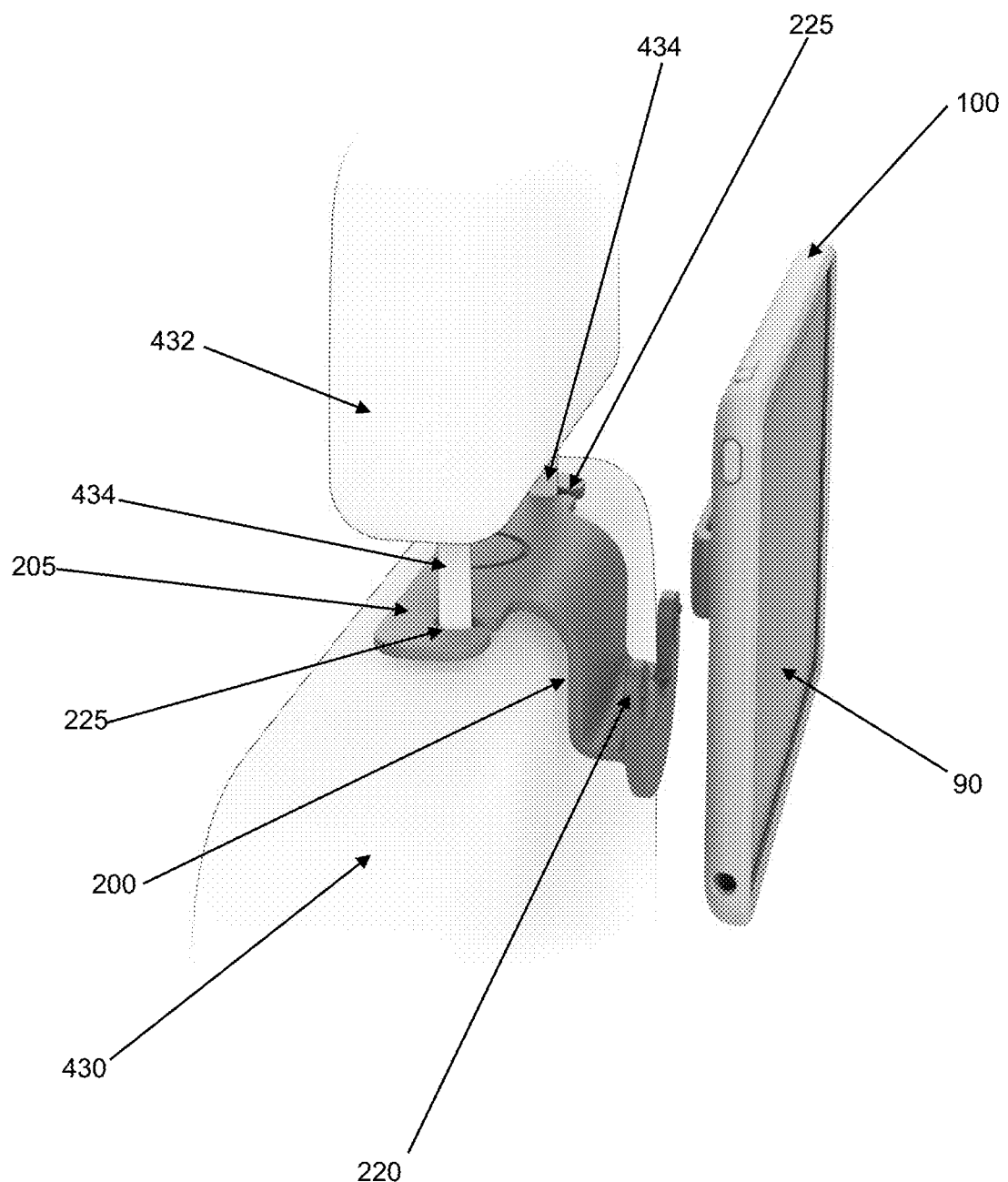
FIG. 4 illustrates the assembly of FIGS. 3A-3C in use with a seat.

FIG. 4 illustrates the assembly of FIGS. 3A-3C in use with a seat 300. Seat 300 may be an automobile seat and includes a headrest 432 with headrest posts 434. Adapter 200 includes post receivers 225 to hang or temporarily attach adapter 200 to posts 434 for temporarily holding case 100 and electronic device 100 in a viewing position on or behind seat 430. Receivers 225 may include some flexible, spongy, or resilient material for accommodating a variety of post sizes and/or post spacings. The flexible or resilient material may enable the receivers 225 to accommodate these dimensional variations while still holding the assembly somewhat snugly in place when used with a particular seat. Receivers 225 may also include slots to accommodate headrest posts with various spacings. Case 100 can be attached to or removed from adapter 200 without necessarily removing adapter 200 from seat 430. As in other examples, adapter 200 and/or adapter body 210 can be bent to achieve a preferred viewing angle.

Figure 5:
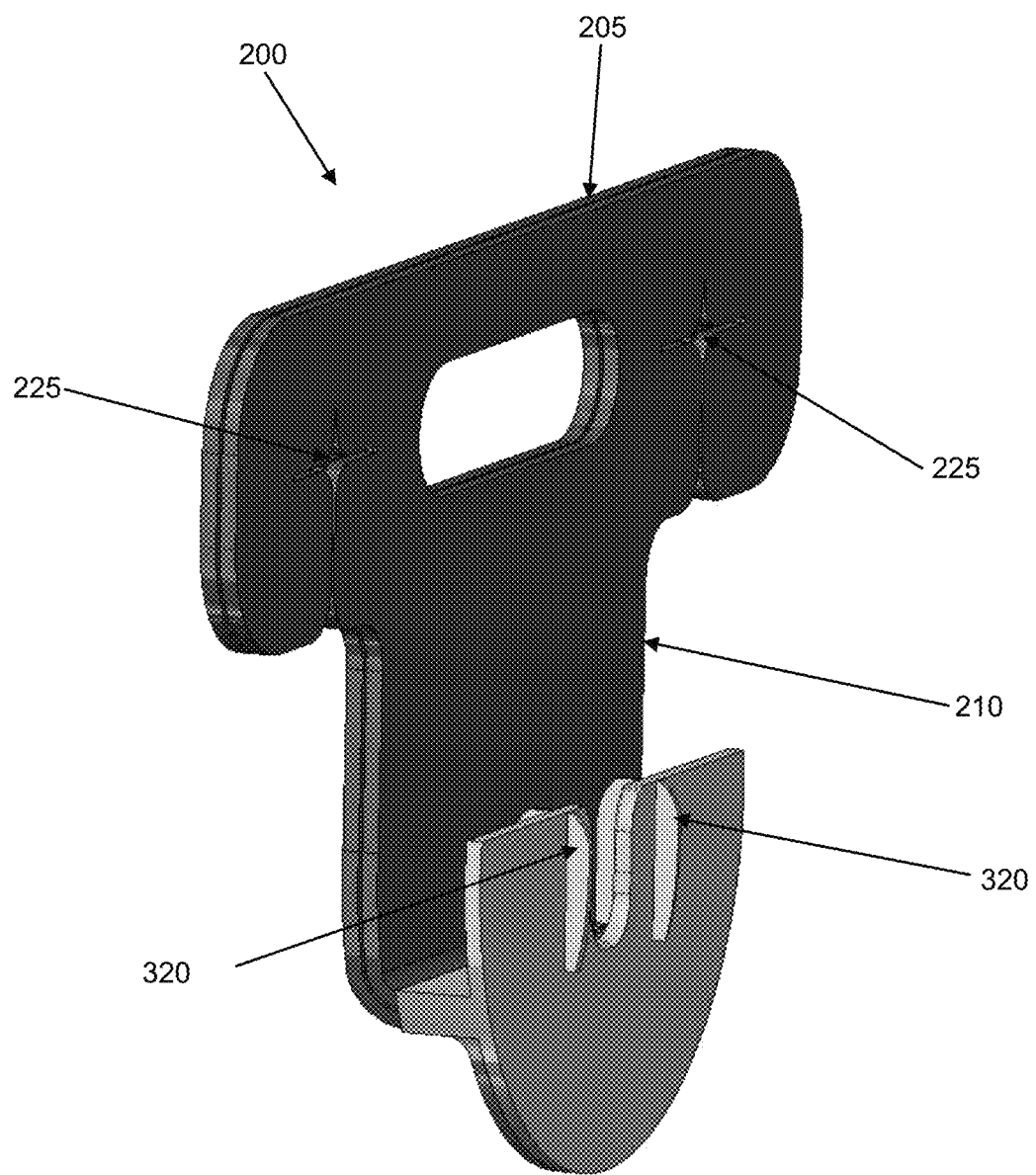
FIG. 5 illustrates another adapter for use with the assembly of FIG. 1.
Figure 6:
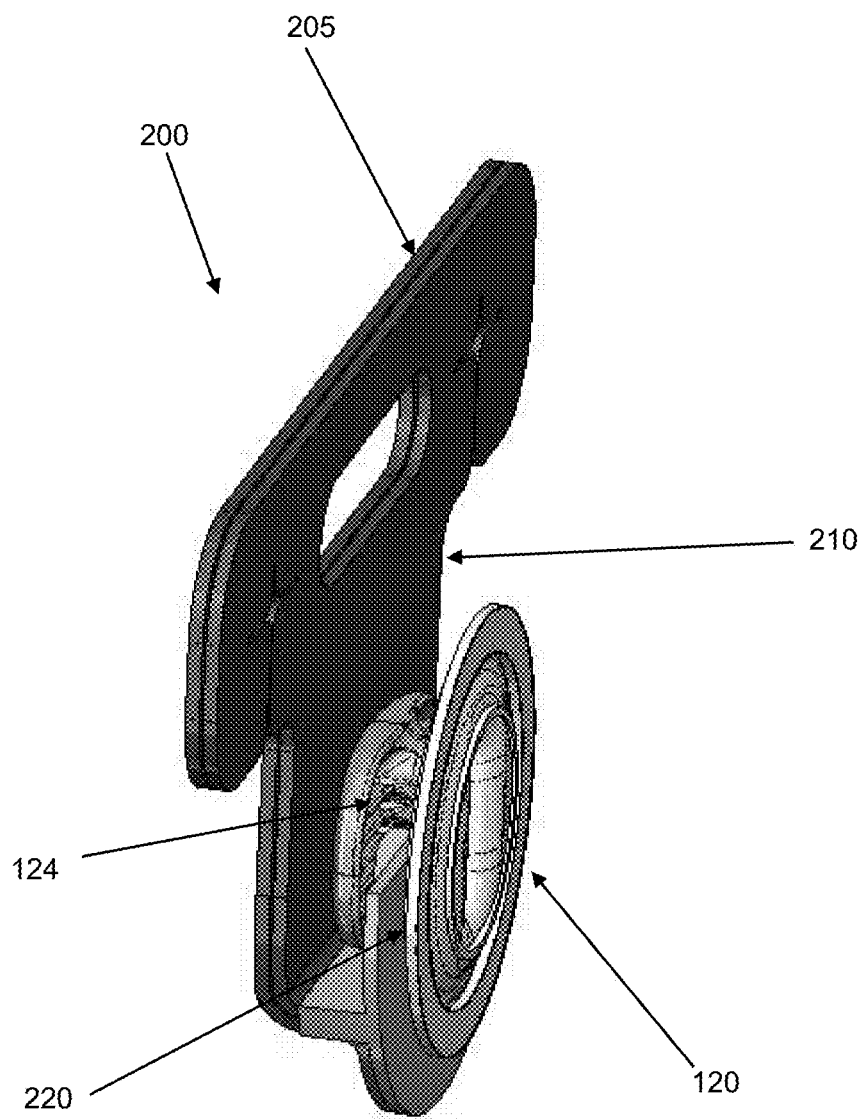
FIG. 6 illustrates the adapter of FIG. 5 with a handle attachment.

FIG. 5 illustrates another adapter 200 for use with the components or systems disclosed herein. In the example of FIG. 5, attachment mechanisms 320 provide a different method of removably attaching handle 124 and handle attachment 120. Attachment mechanisms 320 may provide an interference fit, a friction fit, and/or a snap fit with handle 124 and may do so in more than one axis. FIG. 6 illustrates handle attachment 120 and handle 124 removably attached to adapter 200. As in other examples, case 100 may be attached to handle attachment 120 and the whole assembly used as illustrated in FIGS. 3A-3C.

FIGS. 5 and 6 also illustrate that at least adapter foot 205 may be a multilayer structure. In one example, it may contain an out layer on each side that is made of a relatively hard or stiff material. An inner layer may be made of a more pliable or flexible material and the inner layer may extend further into post receiver areas 225 than the out layers. In this way, the flexible material of the inner layer can conform around posts of different sizes to provide a relatively snug fit while the outer layers still provide stiffness to the overall structure.

Figure 7:
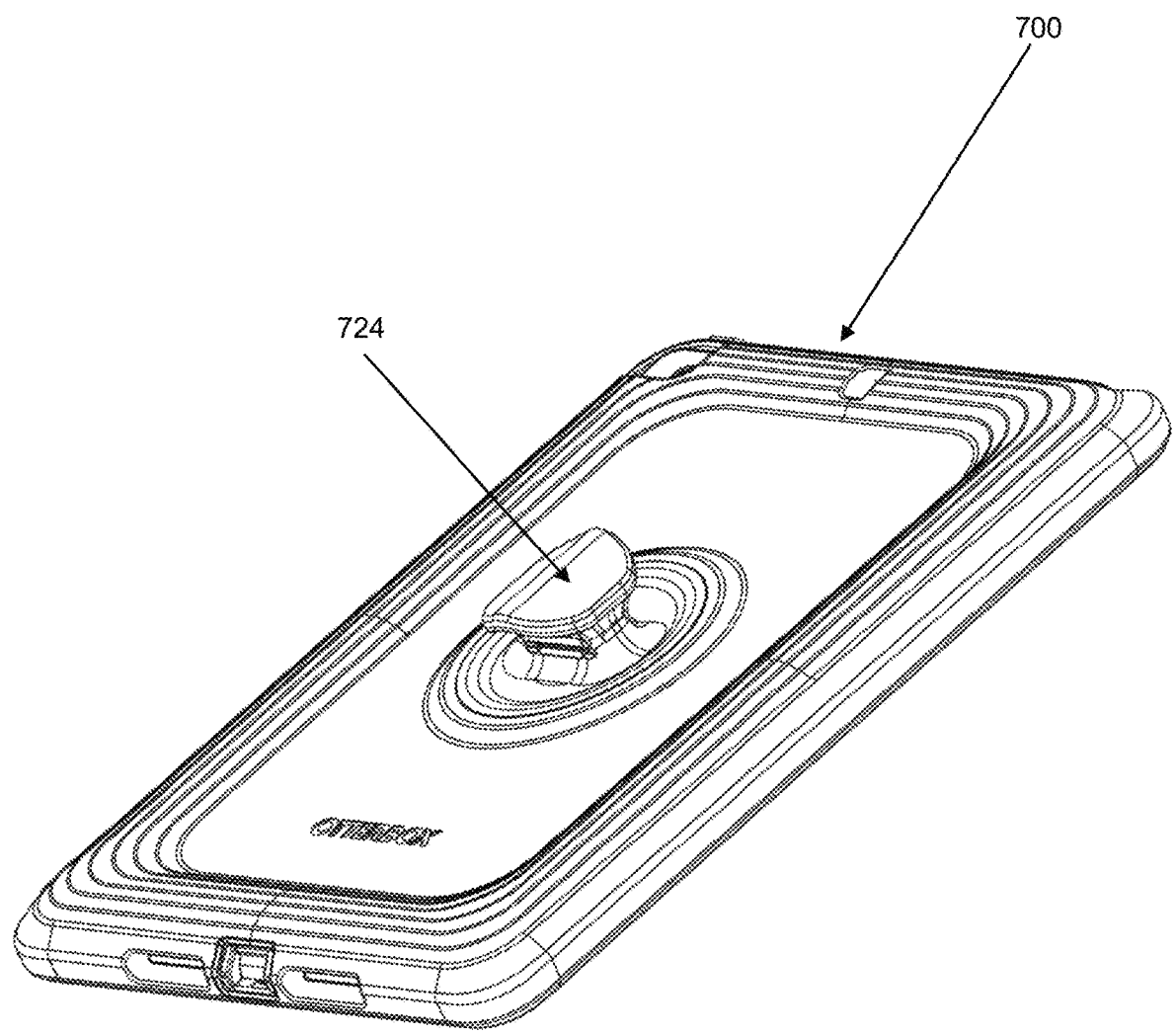
FIG. 7 illustrates a case with a handle.

FIG. 7 illustrates an alternate case 700 for use with an electronic device, such as a tablet computer. Case 700 is an example of case 100 and may have any of the features, elements, characteristics, and/or functions of case 100, including combinations thereof. Case 700 includes a handle 724. Handle 724 is an example of handle 124 and may have any of the features, elements, characteristics, and/or functions of handle 124, including combinations thereof. Handle 724 may have other shapes or sizes. Case 700 covers at least portions of the sides and back of an electronic device installed in case 700.

Figure 8:
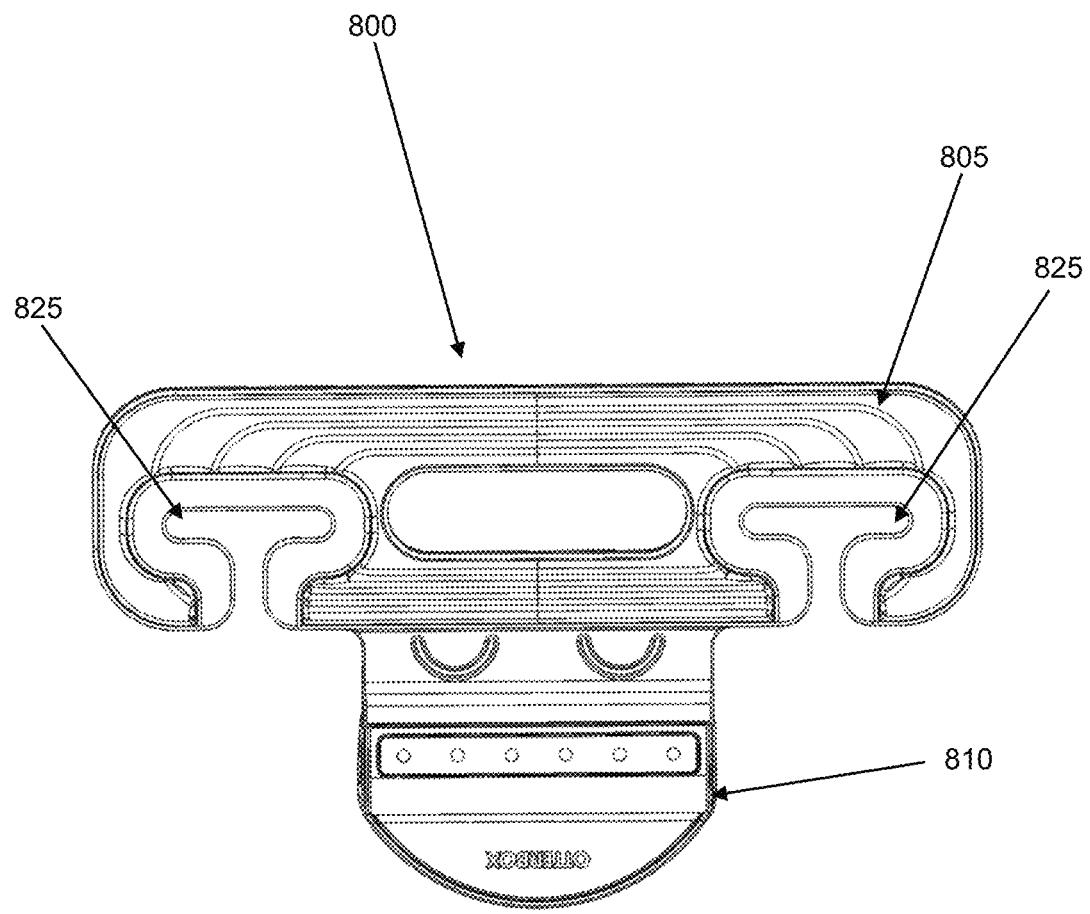
FIG. 8 illustrates an arm for use with the case of FIG. 7.

FIG. 8 illustrates an adapter 800, which may also be referred to as an arm. Adapter 800 is an example of adapter 200 and may have any of the features, elements, characteristics, and/or functions of adapter 200, including combinations thereof. Adapter 800 includes an adapter foot portion 805 and an adapter body portion 810. While specific shapes are illustrated in the figures herein, many other shapes are possible. Adapter 800 may include portions that may each be rigid, flexible, resilient, or bendable. The bendable portions are formed from a material which allows adapter 800 to be bent to a particular shape or angle by a user and stays in that general position when released by the user. Adapter foot portion 805 includes post receivers 825. Post receivers 825 may include slots for accommodating headrests posts with various spacing. Adapter foot portion 805 may be formed from a flexible material that allows it to be temporarily bent to be removably engaged with headrest posts. The inner edges of post receivers may also include a more flexible, foamy, or spongy material to assist in maintaining a snug fit and/or to reduce unwanted vibration or movement around headrest posts.

Figure 9:
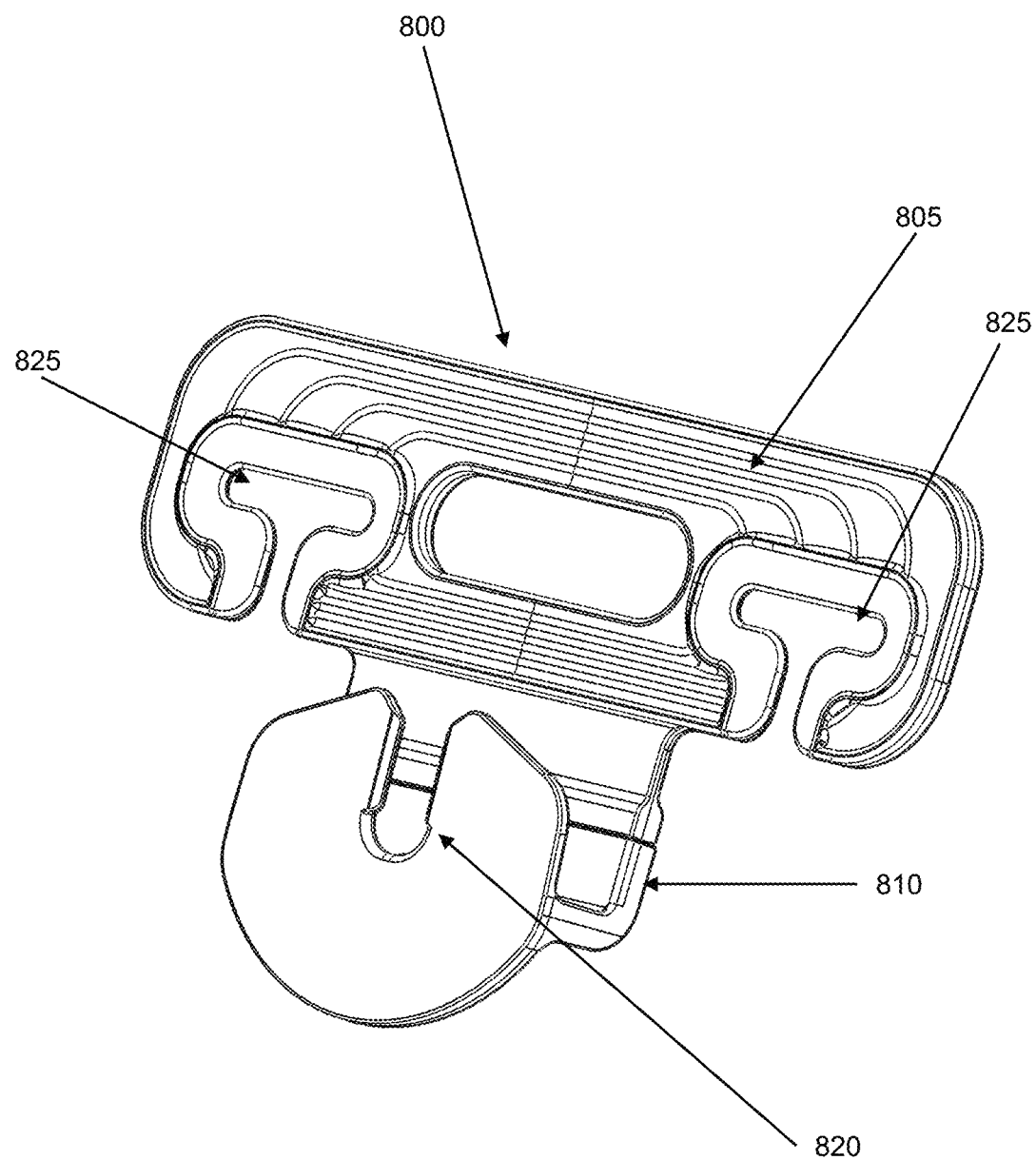
FIG. 9 illustrates another view of the arm of FIG. 8.

FIG. 9 illustrates a rear view of the adapter 800 of FIG. 8. Adapter 800 includes handle receiver 820 for receiving a shoulder portion of handle 724. Handle receiver 820 may include a receiver area, a recess, a hole, a slot, one or more attachment mechanisms, threads, tabs, clips, snaps, ridges, a friction fit, and/or an interference fit for removably or releasably attaching or affixing adapter 800 to handle 724 and/or case 700. Handle 724 may or may not rotate within handle receiver 820 and/or may having a locking feature to selectively and temporarily prohibit rotation.

Figure 10:
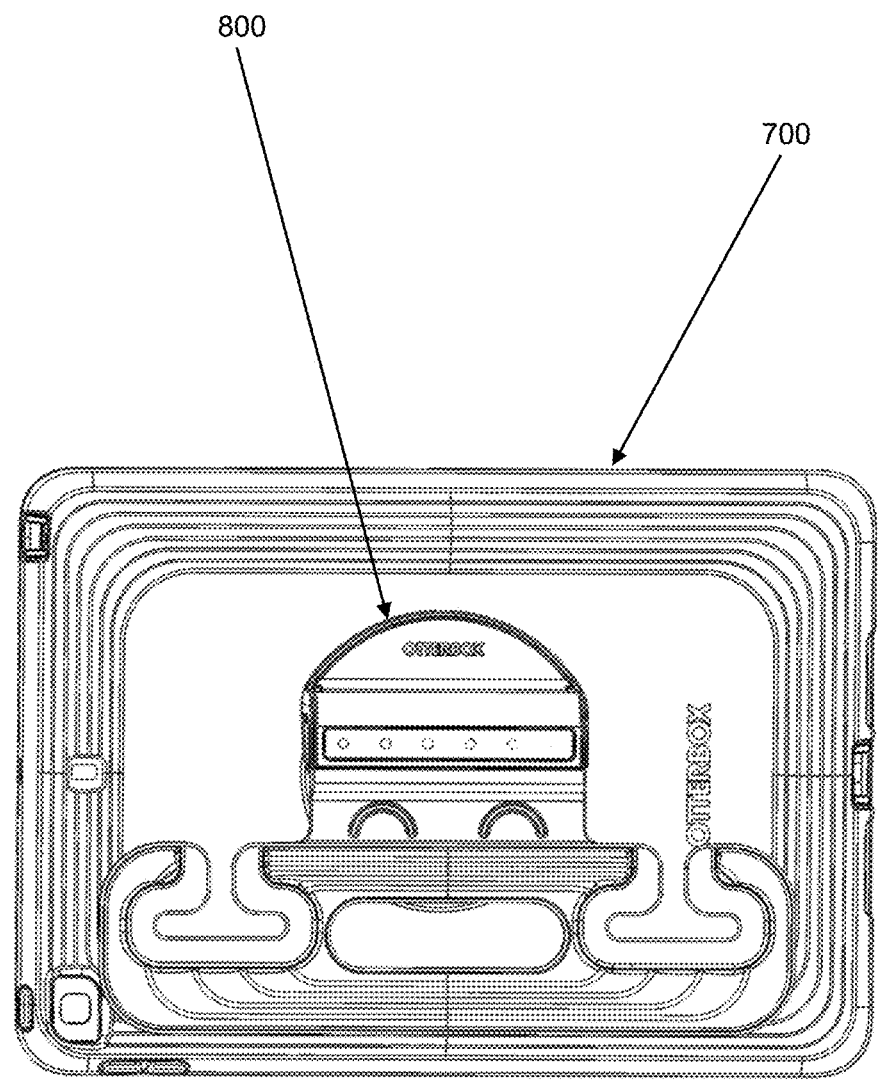
FIG. 10 illustrates a rear view of the case of FIG. 7 with the arm of FIG. 8.
Figure 11:
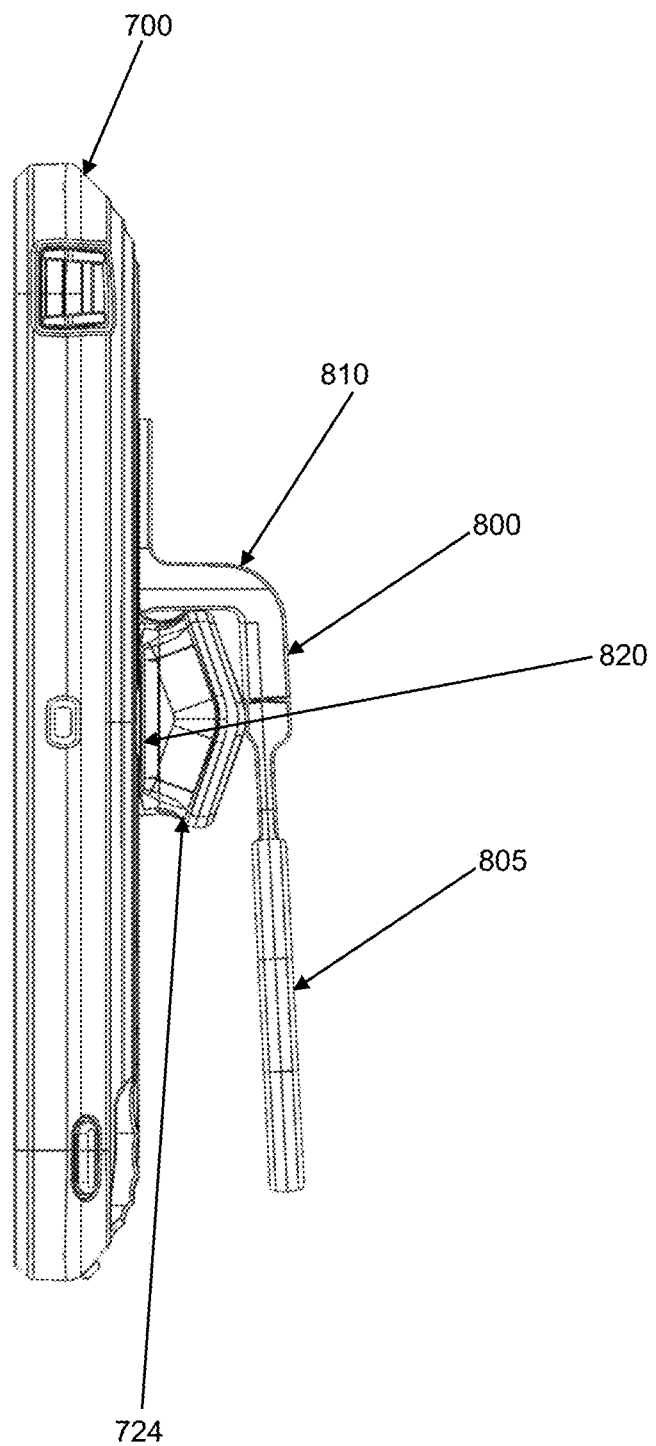
FIG. 11 illustrates a side view of the assembly of FIG. 10.

FIG. 10 illustrates a rear view of case 700 with adapter 800 attached. FIG. 11 illustrates a side view of the assembly of FIG. 10. Adapter foot portion 805 may be bent to various positions by a user similar to those of adapter 200 illustrated in FIGS. 2A-2D. Adapter foot portion 805 may also be bent to various stand positions or to a stowed position similar to those of adapter 200 illustrated in FIGS. 3A-3C.

Figure 12:
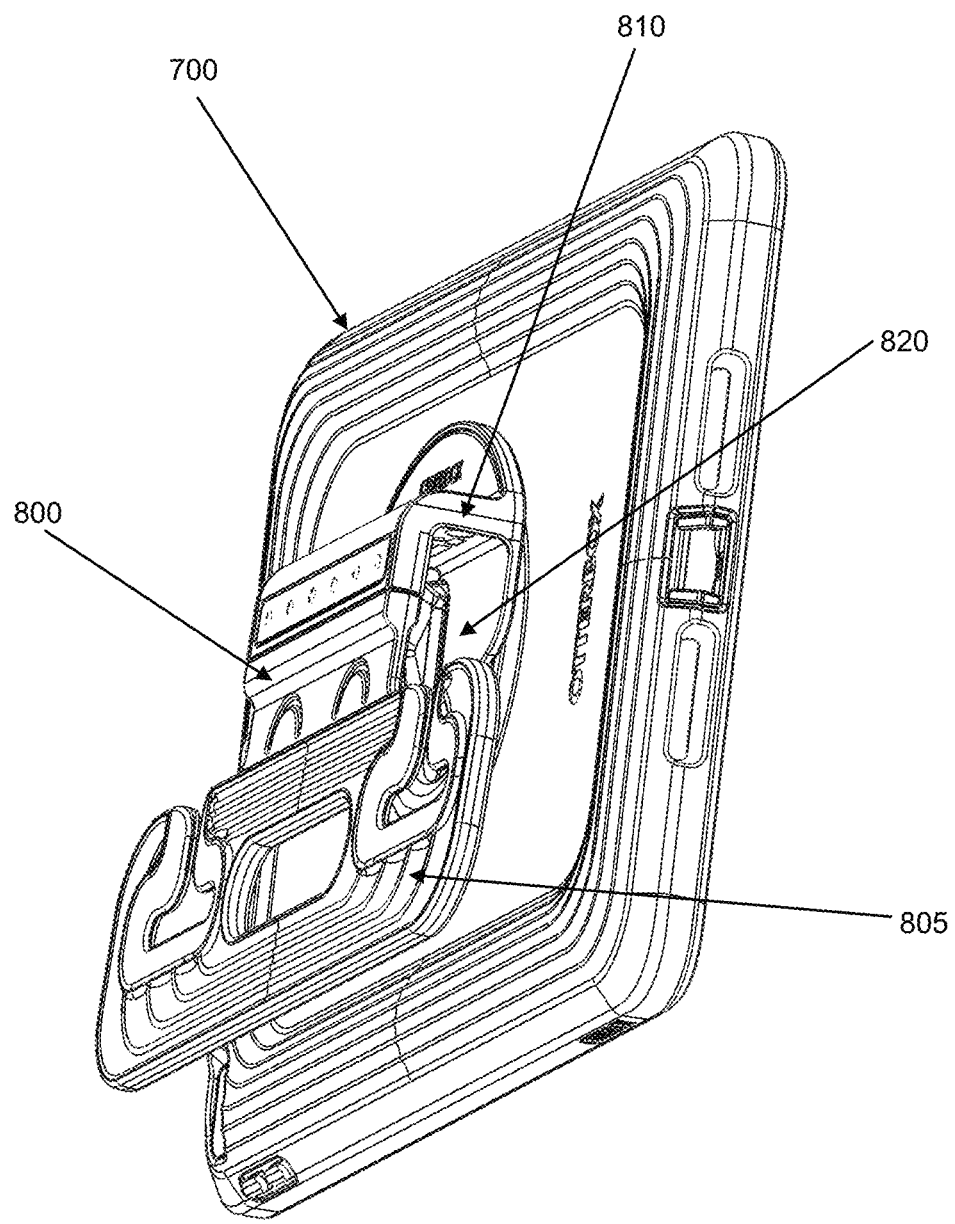
FIG. 12 illustrates a rear perspective view of the assembly of FIG. 10.
Figure 13:
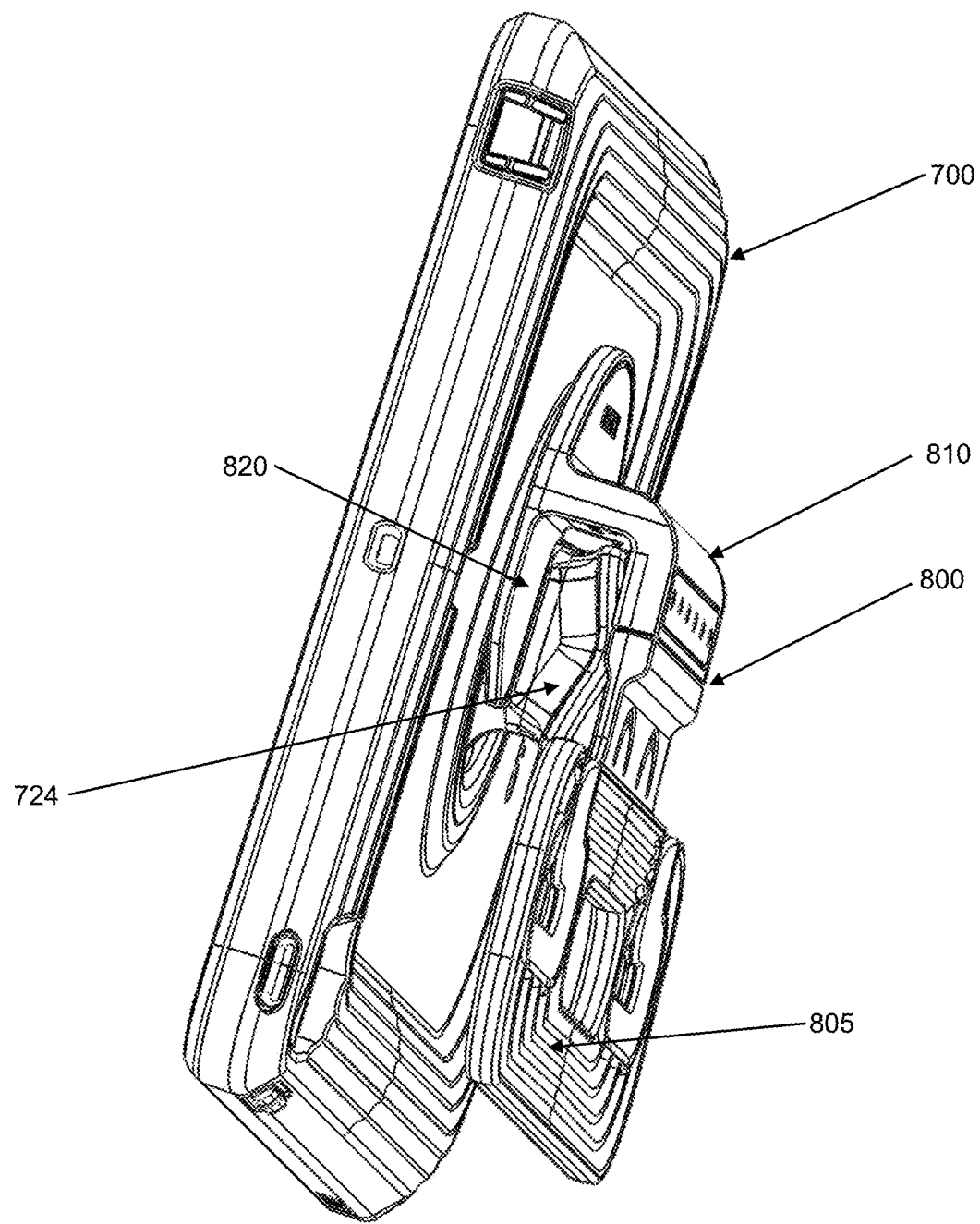
FIG. 13 illustrates an alternative rear perspective view of the assembly of FIG. 10.

FIG. 12 illustrates a rear perspective view of case 700 with adapter 800 attached. FIG. 13 illustrates an alternative rear perspective view of the assembly of FIG. 12. Adapter 800 may be bent or positioned such that the assembly of FIGS. 10-13 may be used with a seat similar to the illustration of FIG. 4. Other configurations are possible.

Any combination of the components or elements disclosed herein may be used together in the form of a system or kit. Any combination of the components disclosed herein may also be described as an accessory for an electronic device.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective case system for use with an electronic device, the protective case system comprising:
   a protective case for removably receiving the electronic device, wherein a display screen of the electronic device remains accessible when the electronic device is installed in the protective case;
   a handle attached to and extending outward from a back surface of the protective case, wherein the handle is configured for carrying the protective case and the installed electronic device; and
   an adapter configured to be removably attachable to the handle, wherein the adapter is configured to be bendable by a user to a plurality of positions and is configured to function as a multi-position stand for the protective case and the installed electronic device, and wherein the adapter is further configured to removably affix the protective case and the installed electronic device to headrest posts of a seat.

2. The protective case system of claim 1 wherein the adapter includes two post receivers configured for each receiving a respective one of the headrest posts.

3. The protective case system of claim 2 wherein the two post receivers of the adapter are spaced apart a same distance as a distance between the headrest posts.

4. The protective case system of claim 2 wherein each post receiver comprises a slot for accommodating, alternately, two or more sets of headrest posts having differing spacing.

5. The protective case system of claim 2 wherein a portion of the adapter including the two post receivers is formed from a flexible material.

6. The protective case system of claim 1 wherein the handle is removably attached to the protective case.

7. The protective case system of claim 1 wherein the handle is permanently attached to the protective case.

8. The protective case system of claim 1 wherein the adapter removably attaches to the handle with an interference fit.

9. The protective case system of claim 1 wherein the adapter removably attaches to the handle with a friction fit.

10. The protective case system of claim 1 wherein the attached adapter is rotatable relative to the protective case.

11. The protective case system of claim 1 wherein the adapter is bendable to at least a stowed position and two different stand positions.

12. The protective case system of claim 1 wherein the adapter is bendable to change a viewing angle of the installed electronic device when the protective case system and the installed electronic device are removably attached to the headrest posts of the seat.

13. A protective case system for use with a tablet computer, the protective case system comprising:
   a protective case configured for covering at least a portion of the tablet computer and removably retaining and protecting the tablet computer;
   a handle attached to and extending outward from a back surface of the protective case, wherein the handle is configured for holding or carrying the protective case and the tablet computer when the tablet computer is installed in the protective case; and
   an adapter configured to be removably attachable to the handle, wherein the adapter is bendable by a user to a plurality of positions and is configured to function as a stand for the protective case and the installed tablet computer, and wherein the adapter is further configured to removably attach the protective case and the installed tablet computer to a seat.

14. The protective case system of claim 13 wherein the attached adapter is rotatable relative to the protective case.

15. The protective case system of claim 13 wherein the adapter is bendable to at least a stowed position and two different stand positions, wherein each of the two different stand positions provides a different viewing angle for the installed tablet computer.

16. The protective case system of claim 13 wherein the seat is an automobile seat.

17. The protective case system of claim 16 wherein the adapter attaches to headrest posts of the automobile seat and the adapter is bendable to change a viewing angle of the installed tablet computer when the protective case system is attached to the headrest posts of the seat.

18. An accessory for use with a tablet computer, the accessory comprising:
  a case for removably retaining and protecting the tablet computer;
  a handle attached to and extending outward from a back surface of the case, wherein the handle is adapted for holding or carrying the case and the tablet computer when the tablet computer is installed in the case; and
  an arm adapted to be removably attachable to the handle, wherein the arm is bendable by a user to a plurality of positions in which the arm remains after the user releases the arm, wherein the arm is adapted to function as a multi-position stand for the case and the installed tablet computer, and wherein the arm includes two slots adapted to removably affix the case and the installed tablet computer to headrest posts of an automobile seat.

19. The accessory of claim 18 wherein the arm includes a rigid portion and a flexible portion, wherein the flexible portion is adapted to attach the arm to the headrest posts.

20. The accessory of claim 18 wherein the arm removably attaches to the handle with an interference fit.

* * * * *